(12) United States Patent
Qu

(10) Patent No.: US 12,413,854 B2
(45) Date of Patent: Sep. 9, 2025

(54) SHOOTING METHOD AND ELECTRONIC DEVICE

(71) Applicant: VIVO MOBILE COMMUNICATION CO., LTD., Guangdong (CN)

(72) Inventor: Song Qu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 311 days.

(21) Appl. No.: 17/859,742

(22) Filed: Jul. 7, 2022

(65) Prior Publication Data

US 2022/0345631 A1 Oct. 27, 2022

Related U.S. Application Data

(63) Continuation of application No. PCT/CN2021/072991, filed on Jan. 21, 2021.

(30) Foreign Application Priority Data

Jan. 22, 2020 (CN) .......................... 202010075710.6

(51) Int. Cl.
*H04N 23/661* (2023.01)
*G06F 3/01* (2006.01)
(Continued)

(52) U.S. Cl.
CPC ........... *H04N 23/662* (2023.01); *G06F 3/017* (2013.01); *H04N 23/62* (2023.01); *H04N 23/64* (2023.01); *H04N 23/57* (2023.01)

(58) Field of Classification Search
CPC ...... H04N 23/662; H04N 23/62; H04N 23/64; H04N 23/80; H04N 23/57; H04N 23/60;
(Continued)

(56) References Cited

U.S. PATENT DOCUMENTS 9,330,308 B2 5/2016 Joo
2011/0013049 A1 1/2011 Thorn
(Continued)

FOREIGN PATENT DOCUMENTS

CN 102595044 A 7/2012
CN 103237172 A 8/2013
(Continued)

OTHER PUBLICATIONS

First Office Action regarding European Patent Application No. 21743730.0, dated Apr. 25, 2024.
(Continued)

*Primary Examiner* — Sinh Tran
*Assistant Examiner* — Angel L Garces-Rivera
(74) *Attorney, Agent, or Firm* — Harness, Dickey & Pierce, P.L.C.

(57) ABSTRACT

A shooting method includes: receiving a first input performed by a target operating body on a first camera among at least one camera; determining, in response to the first input, the first camera as a camera that controls a second camera among the at least one camera to capture an image; receiving a second input performed by the target operating body on the first camera; and controlling, in response to the second input, the second camera to capture a first image in a case that a distance between the target operating body and the first camera is less than or equal to a first threshold.

11 Claims, 5 Drawing Sheets

(51) Int. Cl.
  *H04N 23/57* (2023.01)
  *H04N 23/60* (2023.01)
  *H04N 23/62* (2023.01)

(58) Field of Classification Search
  CPC .. H04N 23/631; H04N 23/633; H04N 23/611; G06F 3/017
  See application file for complete search history.

(56) References Cited

U.S. PATENT DOCUMENTS

| | | |
|---|---|---|
| 2011/0267499 A1 | 11/2011 | Wan et al. |
| 2014/0300542 A1 | 10/2014 | Jakubiak et al. |
| 2015/0205363 A1 | 7/2015 | Wu |
| 2016/0241783 A1 | 8/2016 | Fukui et al. |

FOREIGN PATENT DOCUMENTS

| | | |
|---|---|---|
| CN | 103501413 A | 1/2014 |
| CN | 105100612 A | 11/2015 |
| CN | 105677196 A | 6/2016 |
| CN | 106060383 A | 10/2016 |
| CN | 106101529 A | 11/2016 |
| CN | 106210492 A | 12/2016 |
| CN | 106231175 A | 12/2016 |
| CN | 110557564 A | 12/2019 |
| CN | 110572575 A | 12/2019 |
| CN | 111246105 A | 6/2020 |
| JP | 2012147167 A | 8/2012 |

OTHER PUBLICATIONS

First Office Action regarding Indian Patent Application No. 202227039066, dated Oct. 10, 2022.

Supplementary European Search Report regarding European Patent Application No. 21743730.0-1208, dated Dec. 23, 2022.

International Search Report and Written Opinion of the International Searching Authority regarding International Patent Application No. PCT/CN2021/072991 dated Apr. 8, 2021. Translation provided by Bohui Intellectual Property.

First Office Action regarding Chinese Patent Application No. 202010075710.6, dated Jan. 5, 2021. Translation provided by Bohui Intellectual Property.

Second Office Action regarding Chinese Patent Application No. 202010075710.6, dated Jul. 23, 2021. Translation provided by Bohui Intellectual Property.

SHOOTING METHOD AND ELECTRONIC DEVICE

CROSS-REFERENCE TO RELATED APPLICATIONS

This application is a Bypass Continuation Application of PCT/CN2021/072991 filed on Jan. 21, 2021, which claims priority to Chinese Patent Application No. 202010075710.6, filed on Jan. 22, 2020, which are incorporated herein by reference in their entirety.

TECHNICAL FIELD

Embodiments of the present application relate to the field of communication technologies, and in particular, to a shooting method and an electronic device.

BACKGROUND

With the development of communication technologies, the use of electronic devices with cameras has become more common, and users can use the cameras to capture images.

SUMMARY

Embodiments of the present disclosure provide a shooting method and an electronic device.

In a first aspect, an embodiment of the present disclosure provides a shooting method, applied to an electronic device including at least one camera. The method includes: receiving a first input performed by a target operating body on a first camera among the at least one camera; determining, in response to the first input, the first camera as a camera that controls a second camera among the at least one camera to capture an image; receiving a second input performed by the target operating body on the first camera; and controlling, in response to the second input, the second camera to capture a first image in a case that a distance between the target operating body and the first camera is less than or equal to a first threshold.

In a second aspect, an embodiment of the present disclosure provides an electronic device, including at least one camera. The electronic device includes a receiving module, a determining module, and a control module. The receiving module may be configured to receive a first input performed by a target operating body on a first camera among the at least one camera. The determining module may be configured to determine, in response to the first input received by the receiving module, the first camera as a camera that controls a second camera among the at least one camera to capture an image. The receiving module may be further configured to receive a second input performed by the target operating body on the first camera. The control module may be configured to control, in response to the second input received by the receiving module, the second camera to capture a first image in a case that a distance between the target operating body and the first camera is less than or equal to a first threshold.

In a third aspect, an embodiment of the present disclosure provides an electronic device, including a processor, a memory, a computer program stored in the memory and executable on the processor, the computer program, when executed by the processor, implementing steps of the shooting method provided in the first aspect.

In a fourth aspect, an embodiment of the present disclosure provides a non-transitory computer-readable storage medium, storing a computer program, the computer program, when executed by a processor, implementing steps of the shooting method provided in the first aspect.

In a fifth aspect, a computer program product, when executed by at least one processor, implementing steps of the shooting method provided in the first aspect.

DETAILED DESCRIPTION

Figure 1:
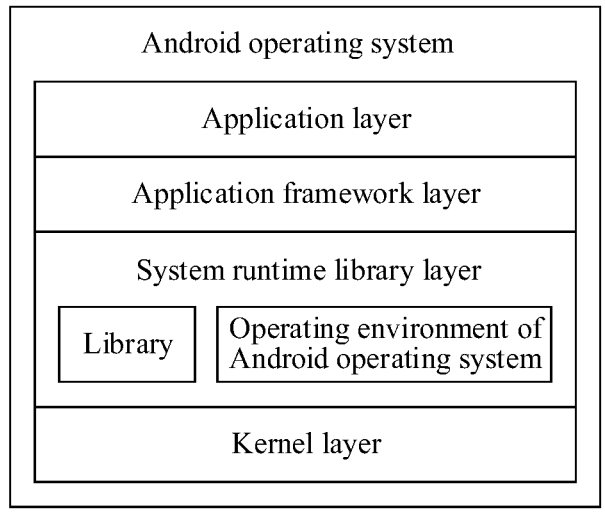
FIG. 1 is a schematic diagram of an architecture of an Android operating system according to an embodiment of the present disclosure.

The following clearly describes the technical solutions in the embodiments of the present disclosure with reference to the accompanying drawings in the embodiments of the present disclosure. Apparently, the described embodiments are merely some of but not all of the embodiments of the present disclosure. All other embodiments derived by a person of ordinary skill in the art based on the embodiments of the present disclosure fall within the protection scope of the present disclosure.

The term "and/or" in this specification is an association relationship for describing associated objects, and represents that three relationships may exist, for example, A and/or B may represent the following three cases: A exists separately, both A and B exist, and B exists separately. The symbol "/" in this specification indicates an "or" relationship between the associated objects, for example, A/B indicates A or B.

The terms such as "first" and "second" in the specification and claims of the present disclosure are intended to distinguish different objects, but do not indicate a specific sequence of objects. For example, a first camera and a second camera are used for distinguishing different cameras, but not for describing a particular order of the cameras.

In the embodiments of the present disclosure, the word such as "exemplary" or "example" is used to represent giving an example, an illustration, or a description. Any embodiment or design scheme described with "exemplarily" or "for example" in the embodiments of the present disclosure should not be explained as being more preferred or having more advantages than another embodiment or design scheme. Exactly, use of the word, such as "exemplarily" or "for example", is intended to present a related concept in a specific manner.

In the description of the embodiments of the present disclosure, "plurality" means two or more unless otherwise described. For example, "a plurality of elements" means two or more elements.

Currently, during shooting by a user using an electronic device, if the user wants to capture an image, the user can trigger the electronic device to capture an image by touching a capturing virtual key displayed on a screen of the electronic device. However, in the above process, since a position of a capturing virtual key on the screen is relatively fixed, it may be inconvenient for the user to operate a virtual key of the electronic device.

Embodiments of the present disclosure provide a shooting method and an electronic device. The method includes: receiving a first input performed by a target operating body on a first camera among at least one camera; determining, in response to the first input, the first camera as a camera that controls a second camera among the at least one camera to capture an image; receiving a second input performed by the target operating body on the first camera; and controlling, in response to the second input, the second camera to capture a first image in a case that a distance between the target operating body and the first camera is less than or equal to a first threshold. According to the solution, the user can trigger, through the first input, the electronic device to determine the first camera among the at least one camera as the camera that controls the second camera among the at least one camera to capture the image, and by moving the target operating body toward the first camera, the electronic device can control the second camera to capture the first image in a case that the electronic device detects that the distance between the target operating body and the first camera is less than or equal to the first threshold. In this way, the user can determine the first camera according to actual use requirements, so that it is convenient for the user to control the second camera to capture the image by using the first camera, thereby achieving more convenient operations of the electronic device and facilitating use for the user.

The electronic device in the embodiments of the present disclosure may be an electronic device having an operating system. The operating system may be an Android operating system, an iOS operating system, or another possible operating system, which is not specifically limited in the embodiments of the present disclosure.

A software environment to which the shooting method provided according to the embodiments of the present disclosure is applied is described below by using an Android operating system as an example.

FIG. 1 is a schematic diagram of an architecture of an Android operating system according to an embodiment of the present disclosure. In FIG. 1, an architecture of the Android operating system includes four layers: an application program layer, an application program framework layer, a system operation library layer, and a kernel layer (which may be a Linux kernel layer).

The application program layer includes various application programs (including system application programs and third-party application programs) in the Android operating system.

The application program framework layer is a framework of an application program. A developer can develop some application programs based on the application program framework layer in a case of complying with the development principles of the framework of the application program.

The system operation library layer includes a library (also referred to as a system library) and a running environment of the Android operating system. The library mainly provides various resources required by the Android operating system. The Android operating system runtime environment is configured to provide a software environment for the Android operating system.

The kernel layer is an operating system layer of the Android operating system and belongs to a bottom layer of a software layer of the Android operating system. The kernel layer provides core system services and hardware-related drivers for the Android operating system based on the Linux kernel.

An Android operating system is used as an example. In the embodiments of the present disclosure, a developer can develop, based on the system architecture of the Android operating system shown in FIG. 1, a software program for implementing the shooting method provided in the embodiment of the present disclosure, so that the shooting method can be performed based on the Android operating system shown in FIG. 1. That is, the processor or the electronic device can implement the shooting method provided in the embodiment of the present disclosure by running the software program in the Android operating system.

The electronic device in the embodiments of the present disclosure may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like, and the non-mobile electronic device may be a personal computer (PC), a television (TV), a teller machine, a self-service machine, or the like, which is not specifically limited in the embodiments of the present disclosure.

The shooting method provided in the embodiments of the present disclosure may be performed by the foregoing electronic device or may be a functional module and/or a functional entity that can implement the shooting method in the electronic device. Details may be determined according to an actual use requirement. This is not limited in the embodiments of the present disclosure. The shooting method provided in the embodiments of the present disclosure is exemplarily described below by using an electronic device as an example.

In the embodiment of the present disclosure, the user can tap an icon of a camera application on the screen of the electronic device to trigger the electronic device to display a camera setting screen on a screen of the electronic device in response to the tap input. Identifiers for indicating at least one camera of the electronic device may be displayed on the screen. The user can tap a first identifier among the identifiers of the at least one camera, and the electronic device determines, in response to the tap input (that is, the first input), a camera corresponding to the first identifier as a first camera used to control a second camera among the at least one camera to capture an image. Then the user can perform an input of moving the target operating body toward the first camera (that is, a second input). The electronic device can control a second camera to capture a first image in a case that the electronic device detects that the distance between the target operating body and the first camera is less than or equal to a first threshold. In this way, the user can determine the first camera according to actual use requirements, so that it is convenient for the user to control the second camera to capture the image by using the first camera, thereby achieving more convenient operations of the electronic device and facilitating use for the user.

Figure 2:
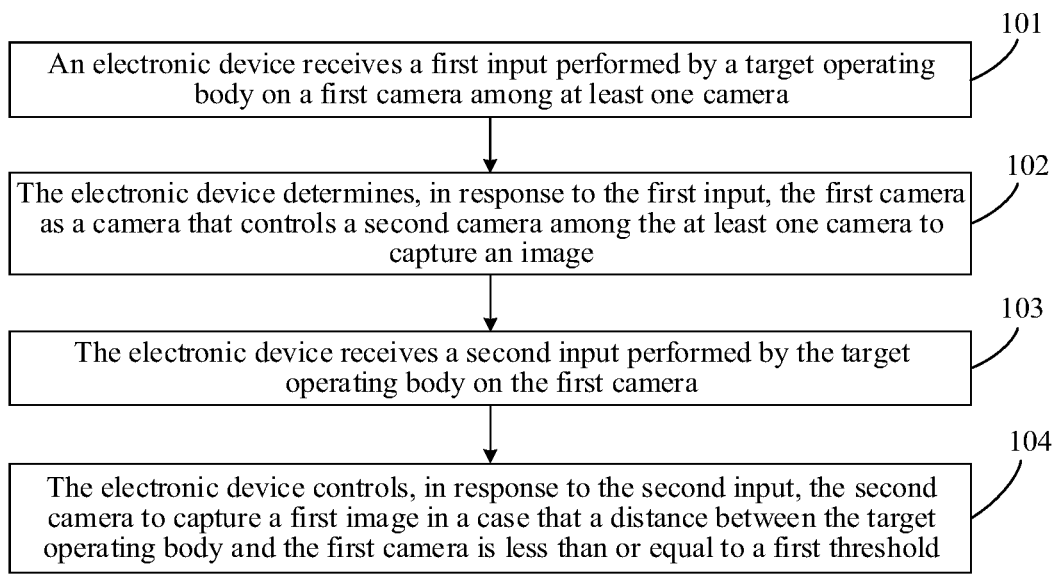
FIG. 2 is a schematic diagram I of a shooting method according to an embodiment of the present disclosure.

As shown in FIG. 2, an embodiment of the present disclosure provides a shooting method. The method is applied to an electronic device including at least one camera. The method may include step 101 to step 104 below.

Step 101: An electronic device receives a first input performed by a target operating body on a first camera among at least one camera.

Optionally, in the embodiment of the present disclosure, the electronic device includes at least one camera. The at least one camera may include a front-facing camera and/or a rear camera. The front-facing camera may be at least one of following: a front-facing under-screen camera, a front-facing telescopic camera, a common front-facing camera, or the like. This may be specifically determined according to the actual use condition, and is not specifically limited in the embodiment of the present disclosure.

Optionally, the front-facing under-screen camera is a front-facing camera mounted under the screen of the electronic device. The front-facing telescopic camera is a camera mounted in a housing of the electronic device and a front-facing camera that can extend from the housing of the electronic device and capture an image. The common front-facing camera is a camera mounted on the bracket of the electronic device and not at a position where the screen is mounted.

Optionally, in the embodiment of the present disclosure, the first camera may be any camera among the at least one camera. The first camera may be a front-facing camera or a rear camera. Since the first camera is a camera that controls the second camera to capture an image, the user can determine a position of the first camera according to actual use requirements. This may be specifically determined according to the actual use condition, and is not specifically limited in the embodiment of the present disclosure.

It should be noted that, in the embodiments of the present disclosure, the first camera is used as a front-facing camera by way of example for illustrative description in the following embodiments, which does not constitute a limitation on the embodiments of the present disclosure.

Optionally, in the embodiment of the present disclosure, the target operating body is an object that can be controlled by the user to move and that can be identified by the first camera. Optionally, the target operating body may be a finger of a user, or may be a toe of the user, and may further be a stylus held by the user that can be identified by the first camera, or the like. This may be specifically determined according to the actual use requirements, and is not specifically limited in the embodiment of the present disclosure.

Optionally, in the embodiment of the present disclosure, the first input may be a touch tap input performed by the target operating body on a camera setting screen in a case that the electronic device displays the camera setting screen, where the touch tap input may be any one of a tap input, a double-tap input, a touch and hold input, or the like. The first input may alternatively be a touch tap input performed by the target operating body on a screen position corresponding to the under-screen camera. The first input may further be a gesture input facing the camera or an input of moving a finger according to a preset trajectory. This may be specifically determined according to the actual use condition, and is not specifically limited in the embodiment of the present disclosure.

Step 102: The electronic device determines, in response to the first input, the first camera as a camera that controls a second camera among the at least one camera to capture an image.

It should be noted that the second camera is one of the at least one camera of the electronic device, may be the same camera as the first camera, or may be a camera different from the first camera.

In addition, the first camera determined to control the second camera among the at least one camera to capture the image is described by using examples in combination with the relevant description of the first input in step 101 in the following embodiment.

For example, the user can touch and hold an icon of a camera application on the screen of the electronic device to trigger the electronic device to display a camera setting screen on a screen of the electronic device in response to the touch and hold input. Identifiers for indicating the at least one camera of the electronic device are displayed on the screen. The user can tap a first identifier among the identifiers of the at least one camera, and the electronic device determines, in response to the tap input, a camera corresponding to the first identifier as a first camera used to control a second camera among the at least one camera to capture an image.

For example, the user can touch and hold an icon of a camera application on the screen of the electronic device to trigger the electronic device to display a screen of the camera application on a screen of the electronic device in response to the touch and hold input. The user can tap a screen position corresponding to an under-screen camera, and the electronic device determines, in response to the tap input, the under-screen camera as a first camera used to control a second camera among the at least one camera to capture an image.

For example, the user can touch and hold an icon of a camera application on the screen of the electronic device to trigger the electronic device to display a screen of the camera application on a screen of the electronic device in response to the touch and hold input. The at least one camera of the electronic device is in an on state. The user can make an OK gesture to the camera that is on, and the electronic device determines, in response to the input, a camera corresponding to the OK gesture as the first camera used to control the second camera among the at least one camera to capture an image.

Optionally, in the embodiment of the present disclosure, after the electronic device determines the first camera as the camera used to control the second camera to capture an image, an identifier may be displayed on the screen of the electronic device, and the identifier is used for indicating that the first camera is a control camera. For example, assuming that the first camera is an under-screen camera, the electronic device may display an elliptical identifier on the screen above the first camera. The elliptical identifier is used for indicating that the first camera is the camera that controls the second camera to capture the image.

Optionally, in the embodiment of the present disclosure, after the electronic device determines that the second camera is the camera used to capture the image, and before the second camera captures the first image, the electronic device may display a preview image captured by the second camera on the screen.

Step 103: The electronic device receives a second input performed by the target operating body on the first camera.

Optionally, in the embodiment of the present disclosure, the second input may be a movement input on the target operating body by the user. Optionally, the second input may be an input of moving the target operating body by the user along a first direction to reduce a distance between the target operating body and the first camera. The second input may alternatively be an input of moving the target operating body by the user along a second direction to reduce the distance between the target operating body and the first camera. The second input may further be an input of moving the target operating body by the user along a plurality of directions to cause a distance between the moved target operating body and the first camera to be less than that before the movement. The second input may be determined according to the actual use requirements, and is not specifically limited in the embodiment of the present disclosure.

Optionally, in the embodiment of the present disclosure, the second input may be an input of controlling the target operating body to move toward the first camera by the user. Moving toward the first camera means that the user controls the target operating body to move in the first direction, so that the decreased distance between the target operating body and the first camera is detected by the first camera. In addition, since the first camera has a field of view, and the image captured by the first camera is within a range of the field of view, the trajectory of the target operating body moving along the first direction should be within the range of the field of view.

Moreover, in the embodiment of the present disclosure, since the target operating body can move along a plurality of directions, the distance between the target operating body and the first camera can be reduced. Therefore, for the convenience of the description of the following embodiments, it is assumed that the target operating body moves along the first direction, where the first direction is a direction in which the target operating body points to the first camera.

It should be noted that, the target operating body is the user finger by way of example in the following embodiments, and the first direction is described by using the direction, as an example, in which the user finger points to the first camera, which does not constitute a limitation on the embodiments of the present disclosure.

Step 104: The electronic device controls, in response to the second input, the second camera to capture a first image in a case that a distance between the target operating body and the first camera is less than or equal to a first threshold.

Optionally, in the embodiment of the present disclosure, the first threshold is a trigger condition for the electronic device to control the second camera to capture the first image. That is, in a case that the electronic device detects that the distance between the target operating body and the first camera is less than or equal to the first threshold, the electronic device controls the second camera to capture the first image. A value of the first threshold may be determined according to actual parameters such as parameters of the first camera, a shape and a size of the target operating body, the movement direction of the target operating body, the movement trajectory of the target operating body, and the like, which is not specifically limited in the embodiment of the present disclosure.

It should be noted that, in the embodiment of the present disclosure, before the second camera is controlled to capture the first image, the first camera may collect an image including the target operating body, and collect a position information of the target operating body on the image, and the like according to the parameter information of the first camera and the actual size information of the target operating body, to determine the distance between the target operating body and the first camera. For a specific determination method, reference may be made to the related art, which is not specifically limited in the embodiment of the present disclosure.

Optionally, in the embodiment of the present disclosure, step 104 of controlling the second camera to capture the first image in a case that the distance between the target operating body and the first camera is less than or equal to the first threshold may be implemented by using step 105 below.

Step 105: Controlling the second camera to capture the first image in a case that the distance between the target operating body and the first camera is less than or equal to the first threshold and greater than or equal to a second threshold.

The second threshold is less than the first threshold.

It should be noted that, in the embodiment of the present disclosure, the first threshold is a trigger condition for the electronic device to control the second camera to capture the first image. That is, in a case that the electronic device detects that the distance between the target operating body and the first camera is less than or equal to the first threshold, the electronic device controls the second camera to capture the first image. The second threshold is a critical point at which the first camera captures a clear image, and the distance between the target operating body and the first camera can be determined through the captured image. That is, in a case that the electronic device detects that the distance between the target operating body and the first camera is less than the second threshold, the target operating body blocks part of light entering the first camera. As a result, the light collected by the first camera is relatively weak, the image collected by the first camera is not clear, and the distance between the target operating body and the first camera cannot be accurately calculated.

Optionally, in the embodiment of the present disclosure, a value of the second threshold may be determined according to actual parameters such as parameters of the first camera, a shape and a size of the target operating body, the movement direction of the target operating body, the movement trajectory of the target operating body, and the like, which is not specifically limited in the embodiment of the present disclosure.

It may be understood that, in the embodiment of the present disclosure, the electronic device can detect the distance between the target operating body and the first camera. In a case that the distance is less than or equal to the first threshold and greater than or equal to the second threshold (the second threshold is less than the first threshold), the electronic device may control the second camera to capture the first image. In this way, the target operating body may be prevented from blocking part of light entering the first camera when the distance between the target operating body and the first camera decreases. As a result, the light collected by the first camera is relatively weak, the image collected by the first camera is not clear, and the distance between the target operating body and the first camera cannot be accurately calculated. Therefore, the electronic device can accurately determine the distance between the target operating body and the first camera by using the first camera, and control the first camera to capture the image when the distance is less than or equal to the first threshold.

Figure 3A:
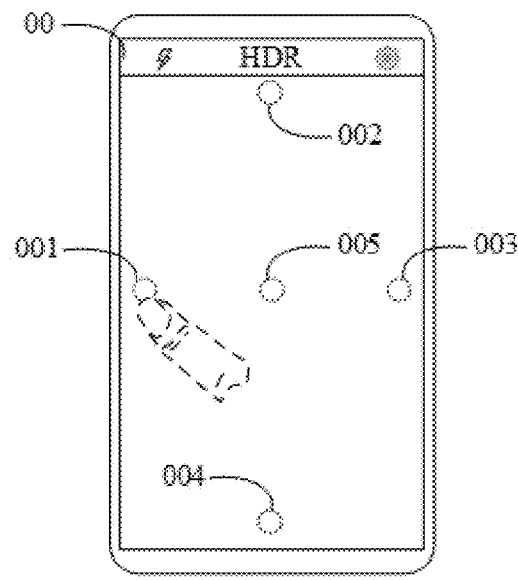
FIG. 3A is a first schematic diagram of an operation of an electronic device according to an embodiment of the present disclosure.
Figure 3B:
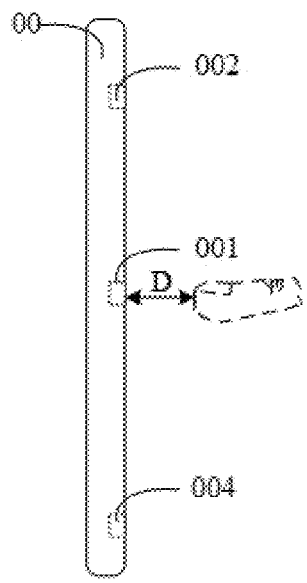
FIG. 3B is a second schematic diagram of an operation of an electronic device according to an embodiment of the present application.

For example, as shown in FIG. 3A, an electronic device 00 has 5 under-screen cameras: a camera 001, a camera 002, a camera 003, a camera 004, and a camera 005. The camera 002 is a second camera used to capture an image. In a case that the electronic device displays a camera application screen, a screen area above the camera 001 can receive an input (that is, a first input) of tapping the area by a user, and the electronic device 00 determines, in response to the tap input, the camera 001 as a first camera used to control the camera 002 (that is, the second camera) to capture an image. As shown in FIG. 3B (FIG. 3B is a side view of FIG. 3A), when the user can move the finger (that is, the target operating body) until a distance between the finger and the camera 001 (that is, the first camera) is less than or equal to a distance D (that is, the first threshold), the electronic device 00 may control, in response to the input (that is, the second input) of moving the finger by the user until the distance between the finger and the camera 001 is less than or equal to the distance D, the camera 002 (that is, the second camera) to capture an image.

An embodiment of the present disclosure provides a shooting method. The method includes: receiving a first input performed by a target operating body on a first camera among the at least one camera; determining, in response to the first input, the first camera as a camera that controls a second camera among the at least one camera to capture an image; receiving a second input performed by the target operating body on the first camera; and controlling, in response to the second input, the second camera to capture a first image in a case that a distance between the target operating body and the first camera is less than or equal to a first threshold. According to the solution, the user can trigger, through the first input, the electronic device to determine the first camera among the at least one camera as the camera that controls the second camera among the at least one camera to capture the image, and by moving the target operating body toward the first camera, the electronic device can control the second camera to capture the first image in a case that the electronic device detects that the distance between the target operating body and the first camera is less than or equal to the first threshold. In this way, the user can determine the first camera according to actual use requirements, so that it is convenient for the user to control the second camera to capture the image by using the first camera, thereby achieving more convenient operations of the electronic device and facilitating use for the user.

Figure 4:
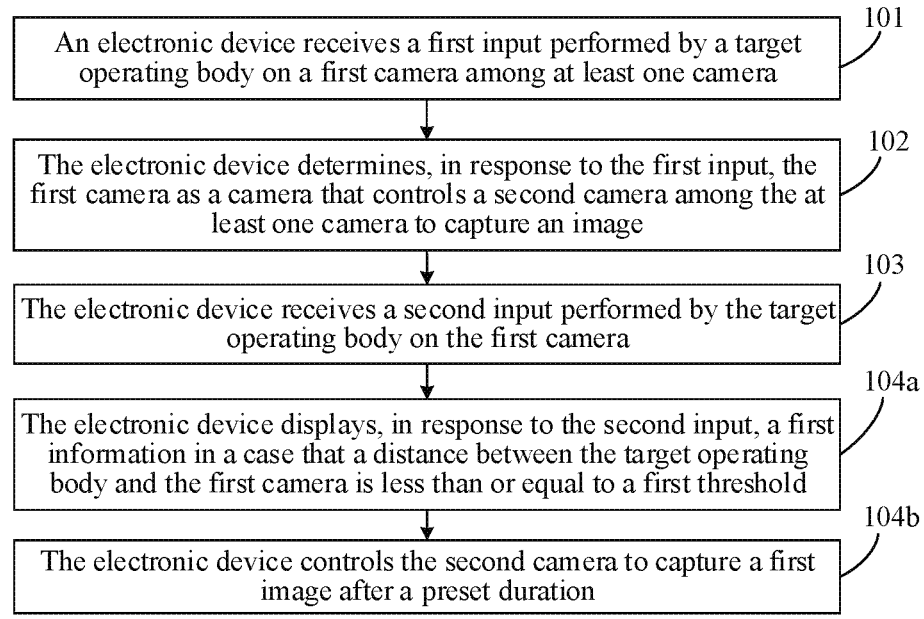
FIG. 4 is a schematic diagram II of a shooting method according to an embodiment of the present disclosure.

Optionally, with reference to FIG. 2, as shown in FIG. 4, step 104 may be implemented by using following steps 104a and 104b.

Step 104a: The electronic device displays, in response to the second input, a first information in a case that a distance between the target operating body and the first camera is less than or equal to a first threshold.

The first information may be used for prompting the second camera to capture the first image after a preset duration.

Optionally, in the embodiment of the present disclosure, the first information may be at least one of a character, a picture, or a video. Optionally, the first information may be text information used for prompting the camera to capture an image after the preset duration, or a number that can be used for countdown. The first information may alternatively be a cartoon image as a prompt, and the cartoon image may be matched with the text information of "capturing an image soon, please keep smiling", or a voice prompt. The first information may further be a video, and the video may be used for prompting to capture an image after the preset duration. This may be specifically determined according to the actual use condition, and is not specifically limited in the embodiment of the present disclosure.

Optionally, in the embodiment of the present disclosure, in addition to the first information, the electronic device may further display an identifier used for prompting the remaining duration of the preset duration. Optionally, the identifier may be a countdown identifier, and may be used for prompting the user to capture a first image after the remaining duration. This may be specifically determined according to the actual use condition, and is not specifically limited in the embodiment of the present disclosure.

Step 104b: The electronic device controls the second camera to capture the first image after the preset duration.

Optionally, in the embodiment of the present disclosure, after the preset duration is reached, the electronic device may output a target prompt information. The target prompt information may be used for instructing the electronic device to capture the first image. Optionally, the target prompt information may be any one piece of beep sounding, flashes flickering, an identifier being displayed, or the like. This may be specifically determined according to the actual use condition, and is not specifically limited in the embodiment of the present disclosure.

It should be noted that, in the embodiment of the present disclosure, in a case that the first camera and the second camera are the same camera, the first information that may be used for prompting the second camera to capture the first image after the preset duration is displayed. In this way, the user may be notified in time that the second input has triggered the second camera to capture an image after the preset duration, which is convenient for the user to move the target operating body closer to the first camera in time, thereby preventing the target operating body from affecting the image captured by the first camera.

For example, it is assumed that the first camera of the electronic device is a shooting control camera, and the second camera of the electronic device is a shooting camera. In a case that the electronic device displays the preview image captured by the second camera, the user can move the finger (that is, the target operating body) toward the first camera until the distance between the finger and the first camera is less than or equal to the first threshold, and a text information of "please prepare for shooting in 5 seconds" and a 5-second countdown (that, the first information) is displayed on the screen of the electronic device in response to the input of moving the finger (that is, the second input). The user can adjust the position of the finger in time according to the prompt of the text information, and prepare to capture an image by using the second camera of the electronic device at the end of the 5-second countdown.

It may be understood that, in the embodiment of the present disclosure, the first information is displayed in a case that the electronic device detects that the distance between the target operating body and the first camera is less than or equal to the first threshold. Therefore, the user may learn from the first information that the second camera will perform the shooting after the preset duration. In this way, it is convenient for the user to adjust a shooting posture and move the target operating body closer to the first camera in time, so as to avoid the target operating body from appearing in the captured image, thereby improving the capture effect.

Figure 5:
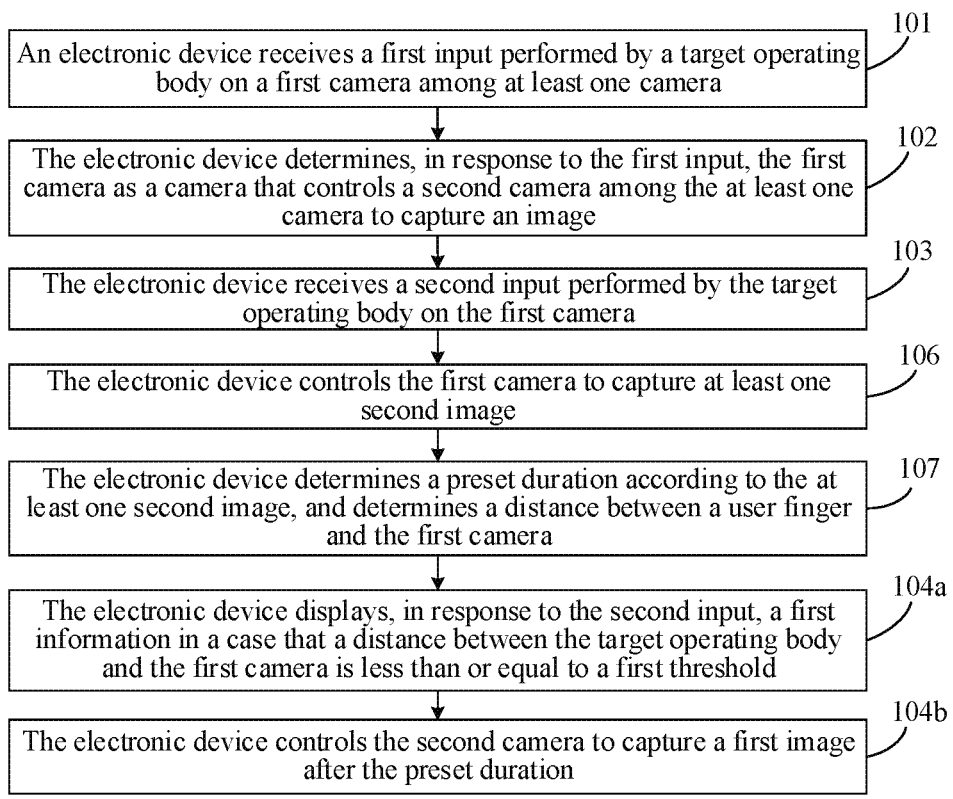
FIG. 5 is a schematic diagram III of a shooting method according to an embodiment of the present disclosure.

Optionally, with reference to FIG. 4, as shown in FIG. 5, the target operating body is a user finger. Before step 104a, the shooting method provided in the embodiment of the present disclosure may further include step 106 and step 107 below.

Step 106: The electronic device controls the first camera to capture at least one second image.

It should be noted that, in the embodiment of the present disclosure, the electronic device controls the first camera to capture the at least one second image. Optionally, a number of captured second images may be determined according to the method for determining the preset duration and the method for determining the distance between the user finger and the first camera, which may be specifically determined according to actual use conditions and is not specifically limited in the embodiment of the present disclosure.

Optionally, in the embodiment of the present disclosure, the second image may be used to determine the preset duration and determine the distance between the user finger and the first camera. Upon completion of the determination, the electronic device may delete at least one second image stored in the electronic device to clear the storage space of the electronic device. This may be specifically determined according to the actual use condition, and is not specifically limited in the embodiment of the present disclosure.

Optionally, in the embodiment of the present disclosure, the electronic device may control the first camera to periodically capture the second image. Specifically, the electronic device can control the first camera to capture one second image at a preset time interval. The preset time interval may be 1 second, 2 seconds, 5 seconds, or the like. This may be specifically determined according to the actual use condition, and is not specifically limited in the embodiment of the present disclosure.

Step 107: The electronic device determines the preset duration and determines a distance between a user finger and the first camera according to the at least one second image.

Optionally, in the embodiment of the present disclosure, the method for determining the distance between the user finger and the first camera may be determined in any one of following three manners. Manner I: The electronic device determines a theoretical size and a theoretical position of the user finger on the second image according to a focal length parameter of the first camera and an actual size of the user finger, and then determines the distance between the user finger and the first camera according to the size of the user finger and the theoretical finger size in the actual second image, and a mapping relationship between the user finger position and the theoretical finger position. Manner II: The electronic device may determine the distance between the user finger and the first camera according to a relationship between the user finger in the second image and other reference objects in the image. Manner III: The electronic device may determine the distance between the user finger and the first camera according to the change amount of the positional relationship of the user fingers in the consecutive at least one second image. This may be specifically determined according to the actual use condition, and is not specifically limited in the embodiment of the present disclosure.

For example, it is assumed that the first camera of the electronic device is a shooting control camera, and the second camera of the electronic device is a shooting camera. Before the electronic device controls the second camera to capture the first image, the electronic device may capture one second image by using the first camera every 1 second. If the electronic device determines, according to the three second images captured in three consecutive seconds, that the user finger moves to the right, the electronic device determines the preset duration as 6 seconds. If areas of the user finger images in the three second images gradually increase and are smaller than an area of the finger image corresponding to the first threshold, and positions of the user finger in the three second images are shifted to upper right corners of the images, the electronic device can determine that the distance between the user finger and the first camera is K, and K is less than the first threshold.

It may be understood that, in the embodiment of the present disclosure, before the electronic device controls the second camera to capture the first image, the electronic device may capture at least one second image by using the first camera, and may determine the preset duration and determine the distance between the user finger and the first camera according to the at least one second image. In this way, the electronic device can accurately determine the distance between the user finger and the first camera, and in a case that the distance between the user finger and the first camera is less than or equal to the first threshold, the electronic device is triggered to control the second camera to capture the first image within the preset duration. Therefore, the second camera is more accurately controlled to capture the first image, thereby improving the effect of capturing the first image.

Optionally, in the embodiment of the present disclosure, step 106 of "determining the preset duration according to the at least one second image by the electronic device" may be implemented by using step 106a or 106b below.

Step 106a: The electronic device determines the preset duration according to a number of user fingers in the at least one second image.

Optionally, in the embodiment of the present disclosure, the method of determining the preset duration according to the number of user fingers in the at least one second image may be determined according to a correspondence between the number of the user fingers and the preset duration. The correspondence may be any one of a function correspondence, a mapping relationship, or the like. This may be specifically determined according to the actual use condition, and is not explicitly limited in the embodiment of the present disclosure.

Optionally, in the embodiment of the present disclosure, the method of determining the preset duration according to the number of user fingers in the at least one second image by the electronic device may be as follows. The electronic device detects the number of the user fingers in the second image corresponding to a preset moment among the at least one second image, and determines, according to the number of the user fingers, the preset duration from the correspondence list of the numbers of the user fingers and the preset durations stored in the electronic device. The preset moment is a shooting moment at which the electronic device captures the second image that can be used to determine the number of the user fingers. This may be specifically determined according to the actual use condition, and is not explicitly limited in the embodiment of the present disclosure.

For example, in the embodiment of the present disclosure, it is assumed that there is the following correspondence in the correspondence list of the numbers of user fingers and the preset durations stored in the electronic device: One user finger corresponds to a preset duration of 2 seconds, two user fingers correspond to a preset duration of 4 seconds, three user fingers correspond to a preset duration of 6 seconds, . . . , and n user fingers correspond to a preset duration of 2n seconds, where n is the number of the user fingers, which is a positive integer. If the number of the user fingers in one of the at least one second image captured by the electronic device is 3, the electronic device may determine, according to the number 3 of the user fingers in the second image and the correspondence list of the numbers of user fingers and the preset durations stored in the electronic device, that the preset duration of the electronic device is 6 seconds.

Step 106b: The electronic device determines a movement direction of each of the user fingers according to the at least one second image, and determines the preset duration according to the movement direction of the user finger.

Optionally, in the embodiment of the present disclosure, the determining the preset duration according to the at least one second image may include: comparing position changes of user fingers in at least two second images according to two second images, determining movement directions of the user fingers, and determining the preset duration according to a correspondence between the finger movement direction and the preset duration; or determining, according to a position of the user finger in one second image, a movement direction of the user finger, and determining the preset duration according to the movement direction of the user finger. This may be specifically determined according to the actual use condition, and is not explicitly limited in the embodiment of the present disclosure.

Optionally, in the embodiment of the present disclosure, the correspondence between the finger movement direction and the preset duration may be determined according to the actual use condition, and is not specifically limited in the embodiment of the present disclosure.

Optionally, in the embodiment of the present disclosure, the user can define that if the finger movement direction is upward, the corresponding preset duration is 2 seconds, if the finger movement direction is downward, the corresponding preset duration is 4 seconds, if the finger movement direction is leftward, the corresponding preset duration is 3 seconds, and if the finger movement direction is rightward, the corresponding preset duration is 6 seconds.

For example, it is assumed that the correspondence between the user finger movement directions and the preset durations stored in the electronic device is that if the finger movement direction is downward, the corresponding preset duration is 4 seconds, and if the finger movement direction is leftward, the corresponding preset duration is 3 seconds. If the electronic device determines, according to two consecutively captured second images, that the user finger movement direction is downward, the electronic device may determine, according to the correspondence between the user finger movement direction and the preset duration stored in the electronic device, that the preset duration of the electronic device is 4 seconds.

Optionally, in the embodiment of the present disclosure, the electronic device may further determine the preset duration according to a gesture in at least one second image. Optionally, in a case that the gesture in at least one second image is a preset gesture, the electronic device may determine a duration corresponding to the preset gesture as the preset duration. Each preset gesture may correspond to a duration. This may be specifically determined according to the actual use condition, and is not specifically limited in the embodiment of the present disclosure.

It may be understood that, in the embodiment of the present disclosure, the electronic device may determine the preset duration according to the number of the user fingers in the second image, or determine movement directions of the user fingers according to at least two second images, and determine the preset duration according to the movement directions of the user fingers. In this way, the electronic device can determine the preset duration by using the number of fingers in the second image captured by the first camera, or the movement directions of the fingers, so that the second camera can be conveniently and flexibly controlled to capture the first image after the preset duration, thereby improving the effect of capturing the first image.

Figure 6:
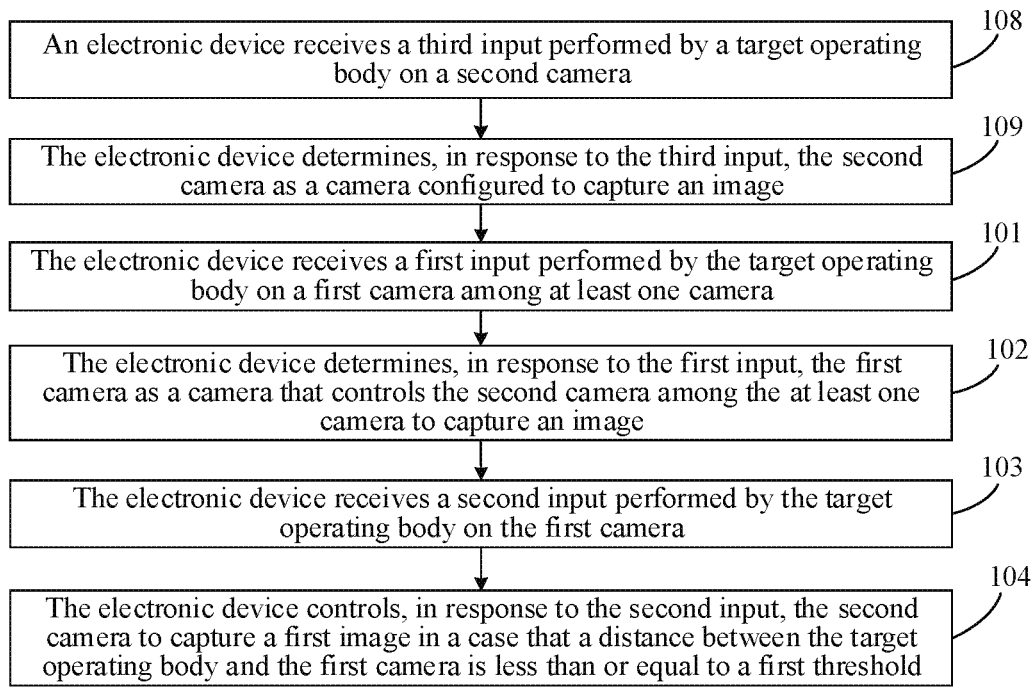
FIG. 6 is a schematic diagram IV of a shooting method according to an embodiment of the present disclosure.

Optionally, with reference to FIG. 2, as shown in FIG. 6, before step 101, the shooting method provided in the embodiment of the present disclosure further includes step 108 and step 109 below.

Step 108: An electronic device receives a third input performed by a target operating body on a second camera.

The third input is a touch tap input or an input of movement along a preset trajectory by the target operating body.

Optionally, in the embodiment of the present disclosure, the third input may be a touch tap input performed by the target operating body on a camera setting screen in a case that the electronic device displays the camera setting screen. The touch tap input may be any one of a tap input, a double-tap input, a touch and hold input, or the like. The third input may alternatively be a touch tap input performed by the target operating body on a screen position corresponding to the under-screen camera. The third input may further be a gesture input facing the camera or an input of moving a finger according to a preset trajectory. This may be specifically determined according to the actual use condition, and is not specifically limited in the embodiment of the present disclosure.

It should be noted that, in the embodiment of the present disclosure, for the relevant description of the third input, reference may be made to the relevant description of the first input in the foregoing step 101 and step 102, and details are not described herein again.

Step 109: The electronic device determines, in response to the third input, the second camera as a camera used to capture an image.

It should be noted that, in the embodiment of the present disclosure, before the electronic device determines a shooting camera (that is, the second camera) and a shooting control camera (that is, the first camera), all cameras of the electronic device are in an on state. After the electronic device determines the shooting camera (that is, the second camera) and the shooting control camera (that is, the first camera), the shooting camera (that is, the second camera) and the shooting control camera (that is, the first camera) are in an on state, and other cameras are in an off state.

Optionally, in the embodiment of the present disclosure, after the electronic device determines the second camera as a camera used to capture an image, an identifier may be displayed on the screen of the electronic device. The identifier is used for indicating that the second camera is a camera for capturing an image. For example, assuming that the second camera is an under-screen camera, the electronic device may display a rhombic identifier on the screen above the second camera. The rhombic identifier is used for indicating that the second camera is the camera that captures the image.

For example, it is assumed that the electronic device may include 6 cameras: an under-screen camera A, an under-screen camera B, an under-screen camera C, an under-screen camera D, an under-screen camera E, and an external camera F. The user can touch and hold an icon of a camera application on the screen of the electronic device to trigger the electronic device to display a screen of the camera application on a screen of the electronic device in response to the touch and hold input. The user can tap a screen position corresponding to the camera E, and the electronic device determines, in response to the tap input, the camera E as a camera used to capture an image, that is, the second camera.

It may be understood that, in the embodiment of the present disclosure, the user can perform the third input on the second camera, and the electronic device determines, in response to the third input, the second camera among at least one camera as a camera used to capture an image. In this way, in a case that the distance between the target operating body and the first camera is less than or equal to the first threshold, the electronic device can control the second camera to capture the image, thereby achieving more convenient operations of the electronic device and facilitating use for the user.

It should be noted that, in the embodiment of the present disclosure, the shooting methods shown in the accompanying drawings are all illustratively described by using a figure in the embodiment of the present disclosure as an example. During implementation, the shooting methods shown in the above accompanying drawings may further be implemented in combination with any other drawings shown in the above embodiments, and the details are not described herein again.

Figure 7:
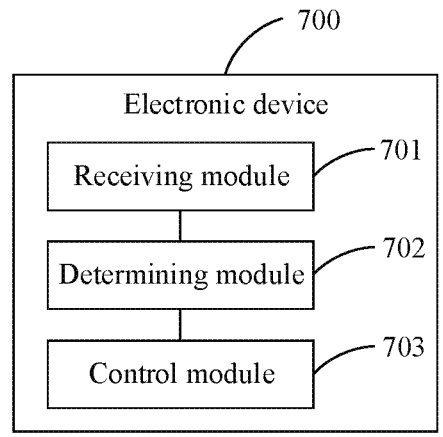
FIG. 7 is a schematic structural diagram I of an electronic device according to an embodiment of the present disclosure.

As shown in FIG. 7, an embodiment of the present disclosure provides an electronic device 700. The electronic device includes at least one camera. The electronic device may include a receiving module 701, a determining module 702, and a control module 703. The receiving module 701 may be configured to receive a first input performed by a target operating body on a first camera among the at least one camera. The determining module 702 may be configured to determine, in response to the first input received by the receiving module 701, the first camera as a camera that controls a second camera among the at least one camera to capture an image. The receiving module 701 may be further configured to receive a second input performed by the target operating body on the first camera. The control module 703 may be configured to control, in response to the second input received by the receiving module 701, the second camera to capture a first image in a case that a distance between the target operating body and the first camera is less than or equal to a first threshold.

Figure 8:
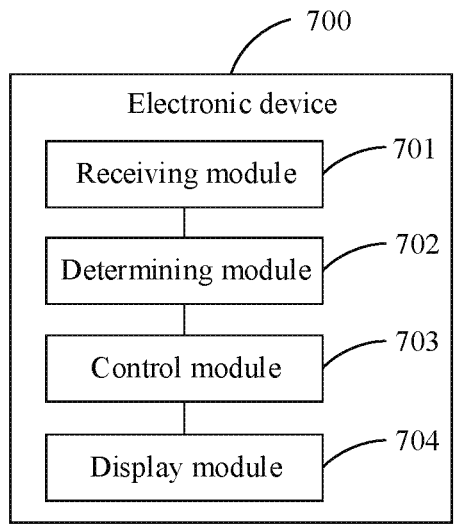
FIG. 8 is a schematic structural diagram II of an electronic device according to an embodiment of the present disclosure.

Optionally, with reference to FIG. 7, as shown in FIG. 8, the electronic device provided in the embodiment of the present disclosure may further include a display module 704. The control module 703 may be configured to: control the display module 704 to display a first information in a case that the distance between the target operating body and the first camera is less than or equal to the first threshold, where the first information may be used for prompting the second camera to capture the first image after a preset duration, and control the second camera to capture the first image after the preset duration.

Optionally, in the embodiment of the present disclosure, the target operating body is a user finger. The control module 703 may be further configured to control the first camera to capture at least one second image. The determining module 702 may be further configured to determine the preset duration and determine a distance between the user finger and the first camera according to the at least one second image.

Optionally, in the embodiment of the present disclosure, the determining module 702 may be configured to determine the preset duration according to a number of user fingers in the at least one second image, or determine a movement direction of one user finger according to the at least one second image, and determine the preset duration according to the movement direction of the user finger.

Optionally, in the embodiment of the present disclosure, the control module 703 may be configured to control the second camera to capture the first image in a case that the distance between the target operating body and the first camera is less than or equal to the first threshold and greater than or equal to a second threshold. The second threshold is less than the first threshold.

Optionally, in the embodiment of the present disclosure, the receiving module 701 may be further configured to receive a third input by the target operating body on the second camera. The third input is a touch tap input or an input of movement along a preset trajectory by the target operating body. The determining module 702 may be further configured to determine, in response to the third input received by the receiving module 701, the second camera as a camera used to capture an image.

The electronic device provided in the embodiments of the present disclosure can implement each process implemented by the electronic device in the foregoing method embodiments. In order to avoid repetition, details are not described herein again.

According to the electronic device provided in the embodiments of the present disclosure, the user can trigger, through the first input, the electronic device to determine the first camera among the at least one camera as the camera that controls the second camera among the at least one camera to capture the image, and by moving the target operating body toward the first camera, the electronic device can control the second camera to capture the first image in a case that the electronic device detects that the distance between the target operating body and the first camera is less than or equal to the first threshold. In this way, the user can determine the first camera according to actual use requirements, so that it is convenient for the user to control the second camera to capture the image by using the first camera, thereby achieving more convenient operations of the electronic device and facilitating use for the user.

Figure 9:
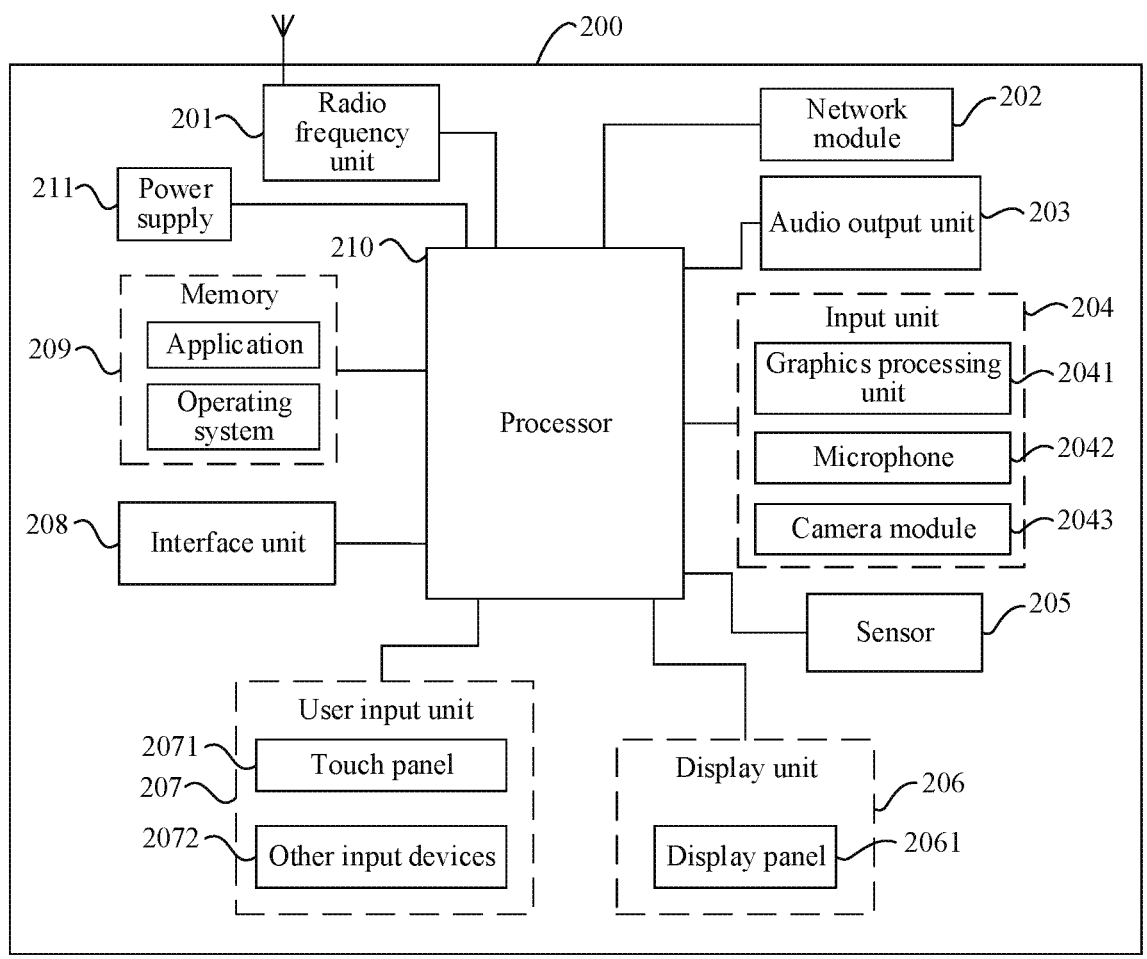
FIG. 9 is a schematic diagram of hardware of an electronic device according to an embodiment of the present disclosure.

FIG. 9 is a schematic structural diagram of hardware of an electronic device implementing various embodiments of the present disclosure. As shown in FIG. 9, the electronic device 200 includes, but is not limited to, components such as a radio frequency unit 201, a network module 202, an audio output unit 203, an input unit 204, a sensor 205, a display unit 206, a user input unit 207, an interface unit 208, a memory 209, a processor 210, and power supply 211. A person skilled in the art may understand that the electronic device structure shown in FIG. 9 does not constitute a limitation to the electronic device. The electronic device may include more or fewer components than those shown in the figure, or some components may be combined, or a different component deployment may be used. In the embodiments of the present disclosure, the electronic device includes, but is not limited to, a mobile phone, a tablet computer, a notebook computer, a palmtop computer, an in-vehicle electronic device, a wearable device, a pedometer, and the like.

A user input unit 207 may be configured to receive a first input performed by a target operating body on a first camera among at least one camera. A processor 210 may be configured to determine, in response to the first input received by the user input unit 207, the first camera as a camera that controls a second camera among the at least one camera to capture an image. The user input unit 207 may be further configured to receive a second input performed by the target operating body on the first camera. The processor 210 may be configured to control, in response to the second input received by the user input unit 207, the second camera to capture a first image in a case that a distance between the target operating body and the first camera is less than or equal to a first threshold.

According to the electronic device provided in the embodiments of the present disclosure, the user can trigger, through the first input, the electronic device to determine the first camera among the at least one camera as the camera that controls the second camera among the at least one camera to capture the image, and by moving the target operating body toward the first camera, the electronic device can control the second camera to capture the first image in a case that the electronic device detects that the distance between the target operating body and the first camera is less than or equal to the first threshold. In this way, the user can determine the first camera according to actual use requirements, so that it is convenient for the user to control the second camera to capture the image by using the first camera, thereby achieving more convenient operations of the electronic device and facilitating use for the user.

It may be understood that in the embodiments of the present disclosure, the radio frequency unit 201 may be configured to send and receive a signal in an information receiving and sending process or a call process. Optionally, after being received, downlink data from a base station is processed by the processor 210. Specifically, after being received, downlink data from a base station is processed by the processor 210. In addition, UL data is sent to the base station. Generally, the radio frequency circuit 201 includes, but is not limited to, an antenna, at least one amplifier, a transceiver, a coupler, a low noise amplifier, a duplexer, and the like. In addition, the radio frequency circuit 201 may further communicate with another device through a wireless communication system and a network.

The electronic device provides wireless broadband Internet access for a user by using the network module 202, for example, helps the user to send and receive an email, browse a webpage, and access stream media, and the like.

The audio output unit 203 may convert audio data received by the radio frequency unit 201 or the network module 202 or stored in the memory 209 into audio signals and output the audio signals as sound. In addition, the audio output unit 203 may also provide audio output (for example, call signal reception sound and message reception sound) related to a specific function performed by the electronic device 200. The audio output unit 203 includes a speaker, a buzzer, a receiver, and the like.

The input unit 204 is configured to receive audio or video signals. The input unit 204 may include a graphics processing unit (GPU) 2041, a microphone 2042, and a camera module 2043. The graphics processing unit 2041 processes image data of static pictures or videos obtained by an image capture apparatus (such as a camera) in a video capture mode or an image capture mode. The processed image frame may be displayed on the display unit 206. The image frame processed by the graphics processing unit 2041 may be stored in the memory 209 (or another storage medium) or sent by the radio frequency unit 201 or the network module 202. The microphone 2042 may receive sound, and can process such sound into audio data. The processed audio data may be converted, in a case of a telephone call mode, into an output format that can be sent to a mobile communication base station by the radio frequency unit 201. The camera module 2043 acquires an image and transmits the acquired image to the graphics processing unit 2041.

The electronic device 200 further includes at least one sensor 205, such as an optical sensor, a motion sensor, and other sensors. Optionally, the optical sensor includes an ambient light sensor and a proximity sensor. The ambient light sensor may adjust luminance of a display panel 2061 according to brightness of the ambient light. The proximity sensor may switch off the display panel 2061 and/or backlight when the electronic device 200 is moved to the ear. As one type of motion sensor, an acceleration sensor may detect magnitude of accelerations in various directions (generally on three axes), may detect magnitude and a direction of the gravity when static, and may be configured to recognize the attitude of the electronic device (for example, switching between landscape orientation and portrait orientation, a related game, and magnetometer attitude calibration), a function related to vibration recognition (such as a pedometer and a knock), and the like. The sensor 205 may further include a fingerprint sensor, a pressure sensor, an iris sensor, a molecular sensor, a gyroscope, a barometer, a hygrometer, a thermometer, an infrared sensor, and the like, which will not be described in detail herein.

The display unit 206 is configured to display an information inputted by the user or an information provided for the user. The display unit 206 may include the display panel 2061. The display panel 2061 may be configured in the form of a liquid crystal display (liquid crystal display, LCD), an organic light-emitting diode (OLED), or the like.

The user input unit 207 may be configured to receive an inputted digit or character information, and generate a keyboard signal input related to the user setting and function control of the electronic device. Optionally, the user input unit 207 may include a touch panel 2071 and another input device 2072. The touch panel 2071, also referred to as a touchscreen, may collect a touch operation of a user on or near the touch panel (such as an operation of a user on or near the touch panel 2071 by using any suitable object or attachment, such as a finger or a touch pen). The touch panel 2071 may include a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 210. Moreover, the touch controller may receive and execute a command transmitted from the processor 210. In addition, the touch panel 2071 may be of a resistive type, a capacitive type, an infrared type, or a surface acoustic wave (SAW) type. In addition to the touch panel 2071, the user input unit 207 may further include the another input device 2072. Optionally, the another input device 2072 may include, but is not limited to, a physical keyboard, a functional key (such as a volume control key or a switch key), a track ball, a mouse, and a joystick. Details are not described herein again.

Optionally, the touch panel 2071 may cover the display panel 2061. After detecting a touch operation on or near the touch panel 2071, the touch panel transfers the touch operation to the processor 210, to determine a type of the touch event. Then, the processor 210 provides corresponding visual output on the display panel 2061 according to the type of the touch event. Although, in FIG. 9, the touch panel 2071 and the display panel 2061 are used as two separate parts to implement input and output functions of the electronic device, in some embodiments, the touch panel 2071 and the display panel 2061 may be integrated to implement the input and output functions of the electronic device, which are not limited herein.

The interface unit 208 is an interface between an external apparatus and the electronic device 200. For example, the external apparatus may include a wired or wireless headset port, an external power supply (or battery charger) port, a wired or wireless data port, a memory card port, a port for connecting an apparatus with a recognition module, an audio input/output (I/O) port, a video I/O port, a headphone port, and the like. The interface unit 208 may be configured to receive an input (for example, a data information or a power) from an external apparatus, and transmit the received input to one or more elements in the electronic device 200, or may be configured to transmit data between the electronic device 200 and the external apparatus.

The memory 209 is configured to store a software program and various data. The memory 209 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 209 may include a high speed random access memory, and may further include a non-volatile memory, such as at least one magnetic disk storage device, a flash memory device or other non-volatile solid state storage devices.

The processor 210 is a control center of the electronic device, and connects to various parts of the electronic device by using various interfaces and lines. By running or executing the software program and/or module stored in the memory 209, and invoking data stored in the memory 209, the processor 610 performs various functions and data processing of the electronic device, thereby performing overall monitoring on the electronic device. The processor 210 may include one or more processing units. Optionally, the processor 210 may integrate an application processor and a modem processor. The application processor mainly processes an operating system, a user interface, an application program, and the like. The modem processor mainly processes wireless communication. It may be understood that the foregoing modem processor may not be integrated into the processor 210.

The electronic device 200 may further include the power supply 211 (such as a battery) for supplying power to the components. Optionally, the power supply 211 may be logically connected to the processor 210 by using a power management system, thereby implementing functions such as charging, discharging, and power consumption management by using the power management system.

In addition, the electronic device 200 includes some function modules that are not shown, which is not described herein in detail.

Optionally, the embodiments of the present disclosure further provide an electronic device, including a processor 110 a memory 209 that are shown in FIG. 9 and a computer program on the memory 209 and executed on the processor 210, where when executed by the processor 210, the computer program implements the processes of the embodiment of the method, and can achieve the same technical effects. To avoid repetition, details are not described herein again.

Optionally, the embodiments of the present disclosure further provide a non-transitory computer-readable storage medium, storing a computer program, where when the computer program is executed by a processor, various processes of the foregoing method embodiments are implemented, and the same technical effects can be achieved. The non-transitory computer-readable storage medium is, for example, a read-only memory (ROM), a random access memory (RAM), a magnetic disk, an optical disc, or the like.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may alternatively be implemented by using hardware, but the former is a better implementation in many cases. Based on such understanding, the technical solutions of the present disclosure or a part thereof that makes a contribution to the prior art may be essentially embodied in a form of a software product. The computer software product is stored in a storage medium (such as a ROM/RAM, a disk, and an optical disk), including several instructions to enable one electronic device (which may be a mobile phone, a computer, a server, an air conditioner a network device, or the like) to perform the methods in the embodiments of the present disclosure.

The embodiments of the present disclosure have been described above with reference to the accompanying drawings. The present disclosure is not limited to the specific embodiments described above, and the specific embodiments described above are merely exemplary and not limitative. A person of ordinary skill in the art may make various variations under the enlightenment of the present disclosure without departing from the spirit of the present disclosure and the protection scope of the claims, and such variations shall all fall within the protection scope of the present disclosure.

What is claimed is:

1. A shooting method, applied to an electronic device comprising at least one camera and comprising:
   receiving a first input performed by a target operating body on a first camera among the at least one camera;
   determining, in response to the first input, the first camera as a camera that controls a second camera among the at least one camera to capture an image;
   receiving a second input performed by the target operating body on the first camera; and
   controlling, in response to the second input, the second camera to capture a first image in a case that a distance between the target operating body and the first camera is less than or equal to a first threshold; wherein
   the controlling the second camera to capture the first image in the case that the distance between the target operating body and the first camera is less than or equal to the first threshold comprises:
   displaying first information in the case that the distance between the target operating body and the first camera is less than or equal to the first threshold, the first information being used for prompting the second camera to capture the first image after a preset duration; and
   controlling the second camera to capture the first image after the preset duration;
   the target operating body is a user finger; and
   before the controlling the second camera to capture the first image, the method further comprises:
   controlling the first camera to capture at least one second image; and determining the preset duration and determining a distance between the user finger and the first camera according to the at least one second image;

the determining the preset duration according to the at least one second image comprises:
  determining the preset duration according to a number of user fingers in the at least one second image; or
  determining a movement direction of the user finger according to the at least one second image, and determining the preset duration according to the movement direction of the user finger.

2. The method according to claim 1, wherein the controlling the second camera to capture the first image in a case that the distance between the target operating body and the first camera is less than or equal to the first threshold comprises:
  controlling the second camera to capture the first image in a case that the distance between the target operating body and the first camera is less than or equal to the first threshold and greater than or equal to a second threshold, wherein the second threshold is less than the first threshold.

3. A computer program product stored in a non-transitory computer-readable storage medium, when executed by at least one processor, implementing the shooting method of claim 2.

4. The method according to claim 1, wherein before the receiving the first input on the first camera among the at least one camera, the method further comprises:
  receiving a third input performed by the target operating body on the second camera, wherein the third input is a touch tap input or an input of movement along a preset trajectory by the target operating body; and
  determining, in response to the third input, the second camera as a camera used to capture an image.

5. A computer program product stored in a non-transitory computer-readable storage medium, when executed by at least one processor, implementing the shooting method of claim 1.

6. An electronic device, comprising a processor, a memory, and a computer program stored in the memory and executable on the processor, wherein the computer program, when executed by the processor, causes the electronic device to perform:
  receiving a first input performed by a target operating body on a first camera among at least one camera;
  determining, in response to the first input, the first camera as a camera that controls a second camera among the at least one camera to capture an image;
  receiving a second input performed by the target operating body on the first camera; and
  controlling, in response to the second input, the second camera to capture a first image in a case that a distance between the target operating body and the first camera is less than or equal to a first threshold; and
the computer program, when executed by the processor, causes the electronic device to perform:
  displaying first information in a case that the distance between the target operating body and the first camera is less than or equal to the first threshold, wherein the first information is used for prompting the second camera to capture the first image after a preset duration; and
  controlling the second camera to capture the first image after the preset duration;

wherein the target operating body is a user finger, and the computer program, when executed by the processor, causes the electronic device to further perform:
  controlling the first camera to capture at least one second image; and
  determining a preset duration and determining distance between the user finger and the first camera according to the at least one second image; and
wherein the computer program, when executed by the processor, causes the electronic device to perform:
  determining the preset duration according to a number of user fingers in the at least one second image; or
  determining a movement direction of the user finger according to the at least one second image, and determining the preset duration according to the movement direction of the user finger.

7. The electronic device according to claim 6, wherein the computer program, when executed by the processor, causes the electronic device to perform:
  controlling the second camera to capture the first image in a case that the distance between the target operating body and the first camera is less than or equal to the first threshold and greater than or equal to a second threshold, wherein the second threshold is less than the first threshold.

8. The electronic device according to claim 6, wherein the computer program, when executed by the processor, causes the electronic device to perform:
  receiving a third input performed by the target operating body on the second camera, wherein the third input is a touch tap input or an input of movement along a preset trajectory by the target operating body; and
  determining, in response to the third input, the second camera as a camera used to capture an image.

9. A non-transitory computer-readable storage medium, storing a computer program, the computer program, wherein the computer program, when executed by a processor of a terminal device, causes the terminal device to perform:
  receiving a first input performed by a target operating body on a first camera among at least one camera;
  determining, in response to the first input, the first camera as a camera that controls a second camera among the at least one camera to capture an image;
  receiving a second input performed by the target operating body on the first camera; and
  controlling, in response to the second input, the second camera to capture a first image in a case that a distance between the target operating body and the first camera is less than or equal to a first threshold; and
the computer program, when executed by the processor, causes the terminal device to perform:
  displaying first information in a case that the distance between the target operating body and the first camera is less than or equal to the first threshold, wherein the first information is used for prompting the second camera to capture the first image after a preset duration; and
  controlling the second camera to capture the first image after the preset duration; and
wherein the target operating body is a user finger, and the computer program, when executed by the processor, causes the terminal device to further perform:
  controlling the first camera to capture at least one second image; and
  determining the preset duration and determining distance between the user finger and the first camera according to the at least one second image; and wherein the computer program, when executed by the processor, causes the terminal device to perform:
  determining the preset duration according to a number of user fingers in the at least one second image; or
  determining a movement direction of the user finger according to the at least one second image, and determining the preset duration according to the movement direction of the user finger.

10. The non-transitory computer-readable storage medium according to claim 9, wherein the computer program, when executed by the processor, causes the terminal device to perform:
  controlling the second camera to capture the first image in a case that the distance between the target operating body and the first camera is less than or equal to the first threshold and greater than or equal to a second threshold, wherein the second threshold is less than the first threshold.

11. The non-transitory computer-readable storage medium according to claim 9, wherein the computer program, when executed by the processor, causes the terminal device to perform:
  receiving a third input performed by the target operating body on the second camera, wherein the third input is a touch tap input or an input of movement along a preset trajectory by the target operating body; and
  determining, in response to the third input, the second camera as a camera used to capture an image.

\* \* \* \* \*